United States Patent
Lüke

(10) Patent No.: US 8,072,350 B2
(45) Date of Patent: Dec. 6, 2011

(54) VEHICLE AND METHOD FOR IDENTIFYING VEHICLES LOCATED IN THE SURROUNDINGS OF THE VEHICLE

(75) Inventor: Stefan Lüke, Olpe (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 442 days.

(21) Appl. No.: 12/439,852

(22) PCT Filed: Oct. 12, 2007

(86) PCT No.: PCT/EP2007/060897
§ 371 (c)(1),
(2), (4) Date: Mar. 4, 2009

(87) PCT Pub. No.: WO2008/043842
PCT Pub. Date: Apr. 17, 2008

(65) Prior Publication Data
US 2010/0052944 A1    Mar. 4, 2010

(30) Foreign Application Priority Data

| Oct. 13, 2006 | (DE) | 10 2006 049 100 |
| Jan. 17, 2007 | (DE) | 10 2007 002 569 |
| Feb. 14, 2007 | (DE) | 10 2007 007 283 |

(51) Int. Cl.
*G08G 1/16*     (2006.01)
(52) U.S. Cl. ........................................ 340/903
(58) Field of Classification Search .......... 340/903, 340/435, 426.16, 436, 426.19, 937; 701/300
See application file for complete search history.

(56) References Cited

U.S. PATENT DOCUMENTS

| 4,990,283 | A | * | 2/1991 | Visca et al. ................ 516/30 |
| 5,680,122 | A | * | 10/1997 | Mio ..................... 340/932 |
| 5,761,630 | A | | 6/1998 | Sekine et al. |
| 6,856,896 | B2 | | 2/2005 | Kushida et al. |
| 6,985,089 | B2 | * | 1/2006 | Liu et al. ................ 340/903 |
| 7,327,238 | B2 | * | 2/2008 | Bhogal et al. .......... 340/436 |
| 7,382,274 | B1 | | 6/2008 | Kermani et al. |
| 7,443,314 | B2 | | 10/2008 | Konishi et al. |
| 2004/0078133 | A1 | | 4/2004 | Miller et al. |
| 2005/0137756 | A1 | | 6/2005 | Takahashi |
| 2005/0216180 | A1 | | 9/2005 | Heinrichs-Bartscher |
| 2006/0132602 | A1 | | 6/2006 | Muto et al. |
| 2006/0162985 | A1 | | 7/2006 | Tanaka et al. |
| 2010/0052945 | A1 | * | 3/2010 | Breed ................... 340/903 |

FOREIGN PATENT DOCUMENTS

| DE | 196 11 379 A1 | 10/1996 |
| DE | 102 49 638 A1 | 7/2003 |
| EP | 1 693 816 A2 | 2/2006 |
| GB | 2 358 506 | 7/2001 |
| JP | 2006 209681 | 8/2006 |
| JP | 2006-310889 | 11/2006 |

* cited by examiner

*Primary Examiner* — Phung Nguyen
(74) *Attorney, Agent, or Firm* — RatnerPrestia

(57) ABSTRACT

Vehicle having a surroundings-sensing system which makes available information on the surroundings to a closed-loop and open-loop control unit of the vehicle, and a closed-loop and/or open-loop control process changes the driving behavior as a function of the acquired information on the surroundings, wherein the vehicle has a registration information system which receives the registration information for vehicles in the surroundings, and in that the registration information system compares the received registration information with the registration information acquired by a surroundings-sensing system and changes the closed-loop and/or open-loop control process as a function of the result of the comparison.

14 Claims, 2 Drawing Sheets

VEHICLE AND METHOD FOR IDENTIFYING VEHICLES LOCATED IN THE SURROUNDINGS OF THE VEHICLE

CROSS REFERENCE TO RELATED APPLICATIONS

This application is the U.S. national phase application of PCT International Application No. PCT/EP2007/060897, filed Oct. 12, 2007, which claims priority to German Patent Application No. DE 10 2006 049 100.9, filed Oct. 13, 2006, German Patent Application No. DE 10 2007 002 569.8, filed Jan. 17, 2007, and German Patent Application No. DE 10 2007 007 283.1, filed Feb. 14, 2007, the contents of such applications being incorporated by reference herein.

BACKGROUND OF THE INVENTION

1. Field of the Invention

The invention relates to a vehicle and a method for identifying vehicles in the surroundings of the vehicle.

2. Description of the Related Art

Devices and methods for performing vehicle dynamics control in a motor vehicle are known. For example, the paper International Congress and Exposition, Feb. 27-Mar. 2, 1995, Detroit, Mich., SAE Paper 950759, 1995 describes a device and a method for performing vehicle dynamics control in a motor vehicle. The vehicle dynamics controller is a system for keeping the motor vehicle stable and in its lane. This is achieved through selective braking of individual wheels of the motor vehicle. For this purpose, the driver's request, that is to say the set point behavior of the motor vehicle, and the behavior of the vehicle, that is to say the actual behavior of the motor vehicle, are determined by means of sensors. In a processing unit/control unit the difference between the set point behavior and the actual behavior is acquired as a control error and the individual actuators, for example the wheel brakes, are controlled with the objective of minimizing the control error. In particular yaw rate sensors, lateral acceleration sensors, steering wheel angle sensors, admission pressure sensors and wheel speed sensors, are used as sensors. There are no indications here of using at least one image sensor system composed of at least two image sensors which pick up essentially the same scene.

In order to assist the driver of a motor vehicle and to actuate the safety means, use is made of surroundings sensors with which, in particular, the distance from objects such as, for example, other vehicles or obstacles can be determined. The sensors in this context are generally embodied as radar, infrared or ultrasonic sensors. Furthermore, it is known that a combination of distance sensors and camera sensors produce a relatively high level of efficiency in the positioning of objects and their classification, and therefore permit additional functions such as detection of pedestrians.

"Handbook of Computer Vision and Applications Volume 1-3" discloses using 3D sensors, such as stereo cameras, to acquire image and position information on objects, therefore permitting wide-ranging safety functions. Furthermore, from the cited volumes it is apparent that a point of interest (POI) can be identified as a relevant region in a scene of the image area from a mono camera image by means of algorithms such as sequence analysis, or analysis of the visual flow can be used indirectly to acquire distances from other road users.

In the text which follows, a device for vehicle-to-vehicle communication and/or for communication between two vehicles over a central infrastructure is referred to as a telematics unit.

DE 102004022289 discloses a method for performing vehicle dynamics control in a motor vehicle. In this context, a sensor senses a measured value and an actuator for performing vehicle dynamics control is actuated as a function of one of the measured values. For the purpose of vehicle dynamics control, image information from the surroundings of the motor vehicle is generated by means of an image sensor system, wherein two image sensors are provided which pick up the same scene. As a result, in order to assist the driver of a motor vehicle, a camera system is used in order to carry out comfort functions or cross-control functions of the motor vehicle which do not require a safe distance signal for objects.

DE 69033962 T2 discloses a method and a device for determining positions having satellite navigation devices. The latter have sufficient precision to be able to use vehicle-to-vehicle communication or communication between two vehicles via a central infrastructure to calculate the relative positioning and relative movement of vehicles with the level of precision which allows driver assistance systems to be operated.

In the text below, a device for vehicle-to-vehicle communication and/or for communication between two vehicles via a central infrastructure is referred to as a telematics unit.

However, the main problem here is that the information on the basis of which the respective application implements its technical control measures on the vehicle is not sufficiently reliable since it is not possible to ensure that further vehicles or objects are not located between the vehicle which is sensed by the telematics unit and the driver's own vehicle. Furthermore, the precision of satellite navigation is not sufficient to assign vehicles, whose approximate position is known from vehicle-to-vehicle communication, in a camera image in order to merge the data items with one another.

The information from a mono camera without a distance sensor is in many cases insufficient for comfort functions or safety functions since the distance from other vehicles cannot be determined reliably enough.

SUMMARY OF THE INVENTION

An object of the present invention is to make available a vehicle and a method which permit reliable determination of vehicles in the surroundings of the vehicle.

The invention relates to the idea that a vehicle which is registered and recognized by means of a camera system is identified such that it is determined whether the registered vehicle is the closest object or whether there are also further vehicles between the registered vehicle and the driver's own vehicle, in order to ensure that there is a free driving tube between the driver's own vehicle and a second vehicle so that, in the case of a vehicle cutting in from the side, it is possible to detect this and abort a closed-loop control process.

There is provision here that a transmitting vehicle is embodied in such a way that the telematics unit transmits both position information and other additional information about the movement of the vehicle or the state of the vehicle but also the (vehicle) registration information such as, for example, the vehicle license number. At the same time, in the vehicle of the type mentioned at the beginning the camera image is evaluated to determine whether the vehicle traveling in front is completely visible and whether its registration license number corresponds to that of the vehicle sensed by the telematics unit.

In this case it can be assumed that there are no objects located between the driver's own vehicle and the vehicle which is sensed by the telematics unit. If this is the case, for example adaptive cruise control (ACC) closed-loop control processes and/or emergency braking functions and/or a lane change warning and/or other function which are usually carried out by means of a distance sensor system are carried out solely on the basis of the communication data which is received and transmitted by the telematics unit and whose plausibility is checked by the camera.

In one advantageous embodiment of the invention, there is provision for the method according to the invention to be expanded with an additional object identification algorithm which already identify a vehicle cutting in before overlapping occurs with the target vehicle, and which switches off the functionality of the driver assistance system.

According to one particularly advantageous embodiment of the invention there is also provision for the absolute positioning of the telematics unit to be improved by the lateral positioning of the camera. In this case, what is referred to as a fusion of the information from the camera and of the vehicle-to-vehicle communication takes place.

On the basis of the abovementioned embodiment of a combination of the camera with the vehicle-to-vehicle communication system, it is possible to expand the closed-loop control methods for an ACC system in an advantageous way compared to transmitting vehicles. It is possible to implement what are referred to as "higher value" methods such as, for example, the well-known ACC Stop&Go method in a simple form. On the basis of this identification it is possible, in the event of imminent accident situations, to address all the functionalities which are referred to by APIA (Active Passive Integration Approach) for actuating passive and active safety measures including a lane change assistance. APIA is to be understood as referring to the networking of active and passive safety systems and the integration of a surroundings sensor system in order to produce vehicles which are as resistant as possible to accidents and injury. The probability of an accident is determined, for example, in a hazard calculator for the current traffic situation and graduated measures for protecting the vehicle occupants and other road users are initiated.

In a further advantageous embodiment of the invention there is provision for satellite navigation information to be improved with the assignment of the relative velocities, the relative acceleration or other data the efficiency of assistance systems which already have distance information of reduced quality.

Further advantages, particular features and expedient developments of the invention emerge from the exemplary embodiments which are described below with reference to FIGS. 1 and 2.

An exemplary embodiment of the invention is illustrated in the drawing and will be described in more detail below.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
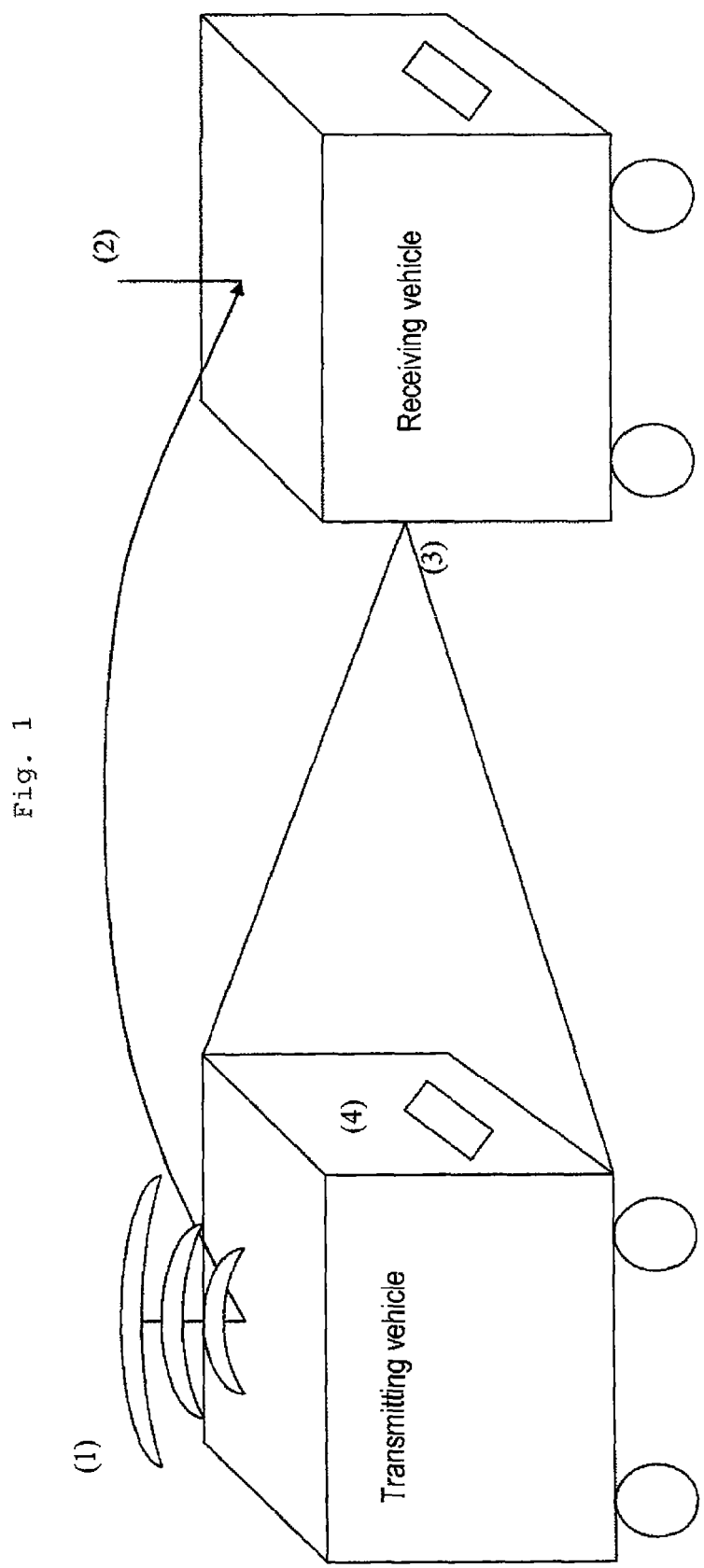
FIG. 1 shows the identification of a vehicle by means of a camera which is designed to sense the surroundings and a telematics unit which is designed to receive and transmit the registration information.

FIG. 1 shows here a schematic illustration of the identification of a vehicle by means of a surroundings-sensing system which is embodied as a camera and which has a telematics unit for transmitting and receiving registration information. The first vehicle (1) transmits the vehicle's own current position, the registration information and further information such as the velocity of the vehicle, the brake signal or the like.

As is indicated in the applications DE 102006029096.8 and DE 102006023339.5 by the patent applicant, information which is used in this invention can be implemented by means of the method described in the two applications. The content of these two abovementioned applications form part of the present application.

The receiving vehicle (2) receives the data. At the same time, the vehicle detects or searches for vehicles in the immediately surrounding area by means of the camera (3) and, if a vehicle has been identified, the license number (4) is acquired and read. It is furthermore checked whether the rear surface of the vehicle is completely visible.

In the search for further vehicles situated in the surroundings, a video monitoring method, which utilizes, for example, optical character recognition (OCR) to identify license numbers of vehicles, is advantageously employed. As a result, a vehicle at a velocity of up to 160 km/h can be registered. According to aspects of the invention, either existing mono video monitoring cameras, cameras in radar equipment or compact camera devices which have been specially developed for that purpose and which are used in various frequency spectra are used. According to aspects of the invention, consideration has been given to camera systems interacting with automated velocity and distance measurement systems for distance control for driver assistance systems. The method step "search for vehicle" (5) is configured in such a way that color, shape and graphic layout of different kinds of vehicle license plates can be searched for and identified. When searching under limited light conditions, infrared light is preferably used in order to carry out visual registration of the surroundings independently of the time of day and therefore of the light conditions.

At first, when the vehicles which are in the surroundings are registered, the relevant image area (POI) is defined. For example the registration information in the form of the vehicle license number plate is selected and segmented as a relevant image area and this area is registered visually, standardized optically and qualitatively improved, and subsequently character identification is carried out in order to obtain the alphanumeric text.

This is carried out in real time for each identified lane. This information can be transmitted in an automated fashion and/or stored for further processing later. Furthermore, according to aspects of the invention consideration has been given to storing both the individual images and/or sequences acquired by the camera and the identified text on a data carrier which is permanently installed in the vehicle or a mobile data carrier. The storage is carried out by transmitting data via a data bus which is located in the vehicle, this being, for example, the CAN bus, and/or by means of mobile data transmissions such as, for example, Bluetooth.

Figure 2:
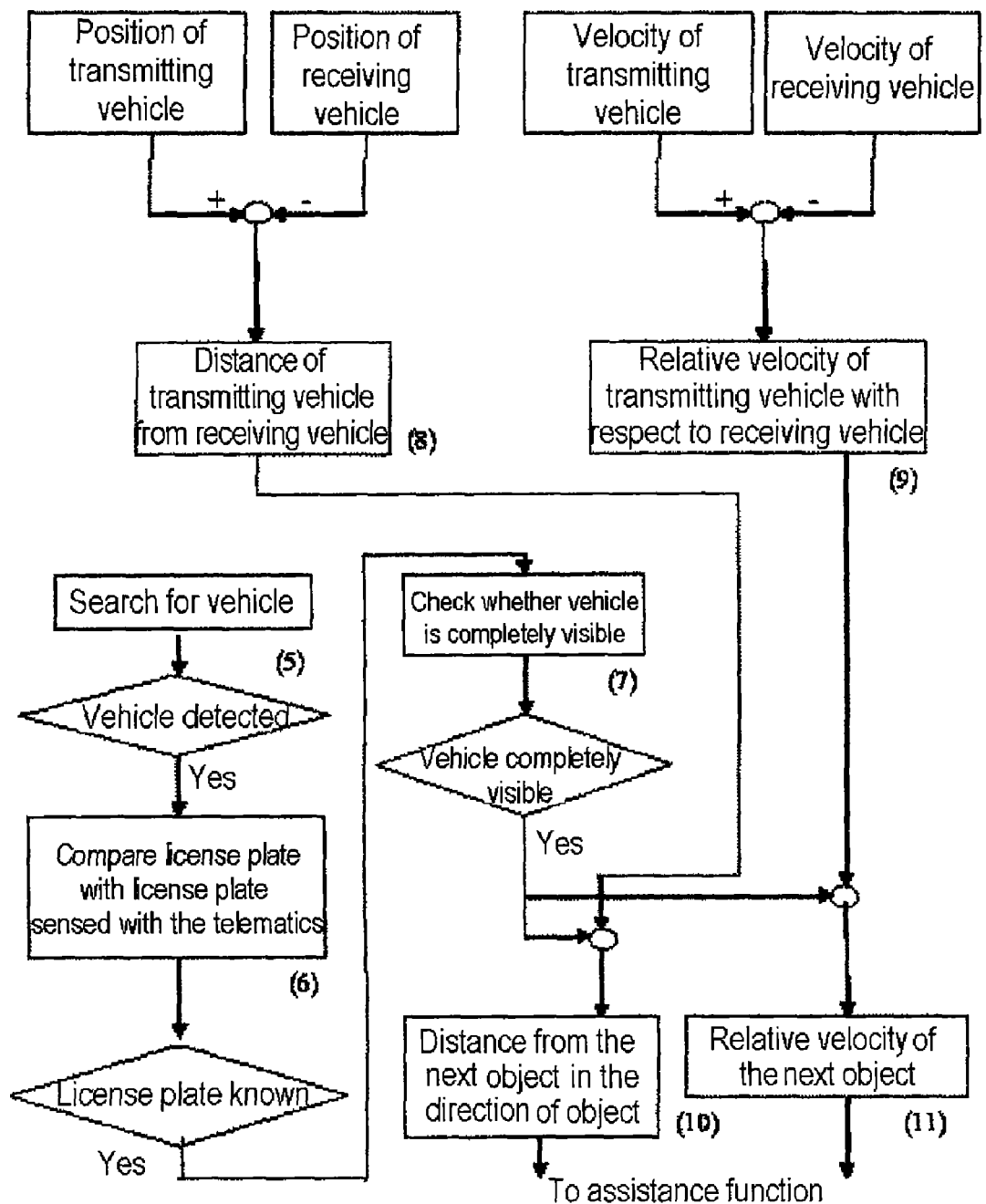
FIG. 2 shows the inventive sequence for generating distance and relative velocity information for driver assistance systems.

FIG. 2 shows the processing steps of the system in the receiving vehicle. In step (5), vehicles are first searched for in the capture range of the camera. If vehicles are detected, their license numbers are read in step (6) and compared, by means of a similarity measure, with vehicles sensed by the telematics unit. If the license number fits the vehicle, in step (7), it is checked whether further objects can be seen in front of the vehicle.

If no unambiguous identification is possible, when, for example, other vehicles or trailer hitches, towing bars or similar objects which are attached to the respective vehicles and which conceal the view of one or two characters on the license plate, according to aspects of the invention information which is acquired by means of the camera is not used for the plausibility checking.

If unambiguous identification is possible, the data acquired in steps (8) and (9) are made available as sensor data (10) to the driver assistance system. In this exemplary embodiment, it is not possible to accept any small faults. If a surroundings-sensing system is used, the incorrect identification of an individual character, or a failure to identify such a character, cannot be tolerated. It is to be ensured that the entire license number is identified correctly since this is a precondition for the functioning of the entire system architecture.

It is possible to apply more wide-ranging method steps to the selected and segmented image areas in order to identify the text in the license numbers. The selected image area is firstly adjusted to a uniform contrast and brightness (standardization) and then segmented for the OCR. Then, the license number is localized and the position of the license plate in the image area is identified. The orientation of the individual elements of the vehicle license number, such as, for example, the size, the differences in the spatial position and the size of the entire vehicle license number, is then determined. During the character segmentation, the individual elements of the license number are acquired and identified. Alphanumeric character recognition is thus carried out.

The quality of each individual step influences the precision of the entire system. For this purpose, filters can in particular be used in order to compensate for optical interference.

Many countries use retro-reflective license numbers. These reflect back the light in the direction of the source, as a result of which a better contrast is produced. Non-reflective characters are also often used, and these also increase the contrast under poor light conditions. Infrared cameras are also well suited for use in such systems, in conjunction with an infrared radiator and a normal light filter in front of the camera.

Unfocussed images make character recognition more difficult. It is therefore advantageously possible to use cameras with a very short exposure time in order to minimize the lack of focus due to movement. The exposure time is preferably $\frac{1}{1000}$ sec. If the camera is mounted at a very low position or if the traffic moves relatively slowly, this time can also be made longer.

In the second embodiment, the embedding of RFID tags in, for example, the vehicle license number makes it possible to identify the registration information. The license number plates are configured in such a way that they cannot be removed without destroying them. These RFID tags are equipped with batteries so that they themselves continuously transmit their identifier, which also comprises the actual license number of the vehicle, for at least ten years after activation. In contrast to passive RFID systems with ranges of only a few meters, the identifier can therefore be read up to a distance of approximately 100 meters with corresponding sensors which are provided in a mobile fashion. The radio identifier is encrypted and can be read out and identified unambiguously.

In this embodiment, the signals of the RFID tags are therefore evaluated instead of the visual sensing. The associated reading devices which are integrated in the telematics unit permit up to two hundred identifiers to be read out simultaneously, even in vehicles which are moving past at high speeds.

In a third embodiment, the registration license number is output in encoded form via the lighting means on the rear of the vehicle. In this context, the lighting means can pass on the encoded registration information with their flashing frequency and their brightness. LED lights are advantageous here, and conventional lighting means can also be used in this context. The camera system recognizes the encoded (light) signals and then checks their plausibility compared to the registration information which is received via the telematics unit.

In a fourth embodiment, the three described methods are combined with one another in such a way that the visually identifiable registration information and the registration information which is emitted by the RFID tag, evaluated by means of the camera system, and the (light) signals at the rear of the vehicle traveling in front evaluated by means of the telematics unit and the camera system. When all three information items correspond, unambiguous identification occurs. If a difference is present, the telematics unit can be used to inform the driver that identification is not possible. A possible reason is, for example, that the stolen license plate has been attached to a vehicle and two different registration license numbers are present here. The telematics unit can be used to inform relevant security authorities.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A vehicle having a surroundings-sensing system which is configured to make information available on the surroundings to a closed-loop control unit and an open-loop control unit of the vehicle, said vehicle comprising:
    a loop control process that is configured to change a driving behavior as a function of acquired information on the surroundings, wherein the loop control process is a closed-loop control process, an open-loop control process or both a closed-loop and an open-loop control process;
    a registration information system configured to receive registration information for vehicles in the surroundings; and
    wherein the registration information system is configured to compare received registration information with registration information acquired by the surroundings-sensing system and change the loop control process as a function of the result of the comparison.

2. The vehicle as claimed in claim 1, wherein a position and a velocity of the vehicles in the surroundings are determined as a function of a result of the comparison of the received registration information and the acquired registration information.

3. The vehicle as claimed in claim 2, wherein distances are calculated from the position of the vehicles in the surroundings and a position of the vehicle itself.

4. Vehicle according to claim 3, wherein a relative velocity is calculated from the velocity of the vehicles in the surroundings and a velocity of the vehicle itself.

5. The vehicle as claimed in claim 4, wherein an ACC closed-loop control process is carried out on the basis of received position information and the relative velocity.

6. The vehicle as claimed in claim 4, wherein passive safety measures, active safety measures, or both passive safety measures and active safety measures are activated on the basis of received position information and the relative velocity.

7. The vehicle as claimed in claim 4, wherein a lane change warning is issued on the basis of the received position information and the relative velocity.

8. The vehicle as claimed in claim 3, wherein an adaptive cruise control (ACC) closed-loop control process is carried out on the basis of received position information.

9. The vehicle as claimed in claim 3, wherein passive safety measures, active safety measures, or both passive safety measures and active safety measures are activated on the basis of received position information.

10. The vehicle as claimed in claim 3, wherein a lane change warning is issued on the basis of received position information.

11. The vehicle as claimed in claim 1, wherein the registration information received by the vehicle is emitted by the vehicles in the surroundings in a unicast mode, a multicast mode, broadcast mode, or any combination thereof.

12. A method for registering objects in the surroundings of a vehicle comprising the following steps:

a. emitting vehicle-specific registration information,
b. receiving the registration information of vehicles in the surroundings,
c. registering the vehicles in the surroundings in an image area,
d. defining a relevant image area,
e. extracting a relevant image area,
wherein, following step (b), a relevant image area is extracted in real time, and the received registration information is compared with the extracted image area by a similarity measure.

13. Method as claimed in claim 12, wherein the relevant image area comprises the registration information of a transmitting vehicle, and the extracted image area is the registration information.

14. Method as claimed in claim 12, wherein the registration information is a license number.

* * * * *